(12) United States Patent
Saito et al.

(10) Patent No.: US 8,925,849 B2
(45) Date of Patent: Jan. 6, 2015

(54) WEBBING RETRACTOR

(71) Applicant: Kabushiki Kaisha Tokai-Rika-Denki-Seisakusho, Aichi-ken (JP)

(72) Inventors: Takuhiro Saito, Aichi-ken (JP); Shinji Mori, Aichi-ken (JP); Takahiro Osaki, Aichi-ken (JP); Tomonari Umakoshi, Aichi-ken (JP); Satoshi Kurata, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 180 days.

(21) Appl. No.: 13/632,518

(22) Filed: Oct. 1, 2012

(65) Prior Publication Data
US 2013/0087649 A1 Apr. 11, 2013

(30) Foreign Application Priority Data

Oct. 7, 2011 (JP) .................................. 2011-222875
Jan. 24, 2012 (JP) .................................. 2012-012469

(51) Int. Cl.
*B65H 75/48* (2006.01)
*B60R 22/44* (2006.01)
(52) U.S. Cl.
CPC ......... *B60R 22/44* (2013.01); *B60R 2022/4453* (2013.01)

USPC .................... 242/372; 242/375; 242/375.1

(58) Field of Classification Search
USPC .................................. 242/372, 375, 375.1
See application file for complete search history.

(56) References Cited

U.S. PATENT DOCUMENTS

| 5,195,693 | A  | * | 3/1993  | Sasaki et al. | 242/372 |
| 6,431,485 | B2 | * | 8/2002  | Mitsuo et al. | 242/372 |
| 7,823,824 | B2 | * | 11/2010 | Benner | 242/372 |
| 2014/0084098 | A1 | * | 3/2014 | Tatsuma et al. | 242/372 |

FOREIGN PATENT DOCUMENTS

JP        2003019946 A      1/2003

* cited by examiner

*Primary Examiner* — Sang Kim
(74) *Attorney, Agent, or Firm* — Roberts Mlotkowski Safran & Cole P.C.

(57) ABSTRACT

A webbing retractor that can alleviate the load on a reducing balance spring without increasing cost and weight is obtained. When a ring inertially rotates in a retraction direction together with a ratchet gear, a ring-side pressing portion of a load receiving portion accommodating portion formed in the ring presses a spring-side load receiving portion of a clutch spring in the retraction direction. Due to this, the clutch spring is loosened, whereby the ring can easily inertially rotate in the retraction direction together with the ratchet gear, and the load acting on a reducing balance spring can be alleviated.

6 Claims, 12 Drawing Sheets

WEBBING RETRACTOR

CROSS-REFERENCE TO RELATED APPLICATION

This application claims priority under 35 USC 119 from Japanese Patent Application Nos. 2011-222875 filed Oct. 7, 2011 and 2012-012469 filed Jan. 24, 2012, the disclosures of which are incorporated by reference herein.

BACKGROUND OF THE INVENTION

1. Field of the Invention

The present invention relates to a webbing retractor equipped with a tension reducer that can, in a state in which webbing that restrains the body of an occupant has been put on, reduce an urging force that urges in a direction in which the webbing is retracted.

2. Related Art

Japanese Patent Application Laid-Open (JP-A) No. 2003-19946 (patent document 1) discloses a webbing retractor (called a "seat belt retractor for an automobile" in patent document 1) in which a reducing balance spring (called an "auxiliary power spring" in patent document 1) is disposed separately from a retracting spring (called a "main power spring" in patent document 1) for urging a spool (called a "seat belt retracting shaft" in patent document 1) in a retraction direction.

In the webbing retractor disclosed in patent document 1, when, in the reducing balance spring, a wound state is changed to a released state, a ratchet wheel rotates in the retraction direction relative to a ring due to the elastic energy of the reducing balance spring and tries to cause the portion in the neighborhood of the inner end of the reducing balance spring to buckle outward in the radial direction. For this reason, cost and weight increase in order to prevent or suppress this buckling of the portion in the neighborhood of the inner end of the reducing balance spring.

SUMMARY OF THE INVENTION

In view of the above circumstances, the present invention is to obtain a webbing retractor that can alleviate the load on the reducing balance spring without increasing cost and weight.

A webbing retractor pertaining to a first aspect of the invention includes: a spool that retracts a webbing; a retracting spring that urges the spool in a retraction direction in which the spool retracts the webbing; a first rotating body that interlockingly rotates with the spool; a clutch member that is provided at the first rotating body in a state in which the clutch member is elastically in pressure contact with the first rotating body, and that rotates together with the first rotating body; a second rotating body that receives a pressing force from the clutch member and rotates (the clutch member engaging); a reducing balance spring that has one end engaged with the second rotating body, urging force of the reducing balance spring increasing by the one end rotating in an orientation corresponding to rotation of the spool in the retraction direction with respect to another end of the reducing balance spring; a third rotating body with which the other end of the reducing balance spring is engaged; and a regulating member that regulates rotation of the third rotating body by a tongue provided on the webbing being attached to a buckle, wherein the webbing retractor is set such that pressure contact of the clutch member with respect to the first rotating body is loosened due to a reaction force of pressing force, which the clutch member receives from the second rotating body, when the clutch member rotates together with the first rotating body, and the pressure contact of the clutch member with respect to the first rotating body is loosened by the third rotating body, rotating due to the urging force of the reducing balance spring, pressing the clutch member via the reducing balance spring.

In the webbing retractor pertaining to the first aspect, when an occupant pulls the webbing in order to put on the webbing, the spool is caused to rotate in a withdrawal direction. Next, when the tongue provided on the webbing is attached to the buckle in a state in which the webbing has been withdrawn, the regulating member operates (works) and engages with the third rotating body. Due to this, the rotation of the third rotating body is regulated. When the withdrawal of the webbing by the occupant is ceased in this state, the urging force of the retracting spring causes the spool to rotate in the retraction direction until the webbing fits the body of the occupant. The first rotating body rotates interlockingly with the rotation of the spool, and the clutch member rotates together with the first rotating body.

Moreover, when the second rotating body is pressed (pushed) by the rotating clutch member and the second rotating body rotates, the one end of the reducing balance spring engaged with the second rotating body rotates. In this state, the rotation of the third rotating body with which the other end of the reducing balance spring is engaged is regulated, so when the second rotating body rotates as described above, the one end of the reducing balance spring rotates with respect to the other end, and due to this, the urging force of the reducing balance spring increases.

The force that causes the one end of the reducing balance spring to rotate via the first rotating body, the clutch member, and the second rotating body in this state is the urging force of the retracting spring. For this reason, some or all of the urging force of the retracting spring is offset (counterbalanced) by the urging force of the reducing balance spring. Due to this, the feeling of pressure that the occupant who has put on the webbing feels is alleviated as a result of the retracting spring urging the spool in the retraction direction.

Further, as described above, the urging force of the reducing balance spring transmits to the clutch member via the second rotating body and tries to loosen the elastic pressure contact of the clutch member with respect to the first rotating body. For this reason, when the urging force of the reducing balance spring exceeds a predetermined magnitude, the mechanical coupling between the clutch member, whose elastic pressure contact with respect to the first rotating body has loosened due to this urging force, and the first rotating body due to the elastic pressure contact is ceased (released).

In this state, the urging force of the reducing balance spring becomes equal to or less than the predetermined magnitude, and the clutch member rotates together with the second rotating body until the clutch member is again coupled to the first rotating body by elastic pressure contact. In this way, the urging force of the reducing balance spring does not exceed the predetermined magnitude, so the burden on the reducing balance spring can be alleviated.

When the occupant pulls out the tongue from the buckle in order to remove the webbing, for example, the regulation of the rotation of the third rotating body by the regulating member is cancelled. The third rotating body rotates due to the urging force of the reducing balance spring. When the third rotating body tries to rotate further due to inertia in a state in which the relative positional relationship of the other end with respect to the one end of the reducing balance spring has returned to its initial state, this rotation transmits to the reducing balance spring and causes the second rotating body to rotate.

The second rotating body that has been caused to rotate in this way presses (pushes) the clutch member. The elastic pressure contact of the clutch member, which has received the pressing force from the second rotating body, with respect to the first rotating body is loosened, and the mechanical coupling between the clutch member and the first rotating body resulting from elastic pressure contact is ceased. Due to this, the burden on the reducing balance spring can be alleviated without increasing cost and weight.

A webbing retractor pertaining to a second aspect of the invention is the webbing retractor pertaining to the first aspect, wherein the clutch member is configured to include: a spring body that is wound onto an outer peripheral portion of the first rotating body, a spring-side pressing portion that extends outward in a radial direction from one end of the spring body and that is positioned at a side of a direction opposite to a predetermined rotational direction that is a rotational direction of the clutch member interlocked with rotation of the spool in the retraction direction with respect to a second rotating body-side load receiving portion set in the second rotating body and faces the second rotating body-side load receiving portion, the spring-side pressing portion pressing the second rotating body-side load receiving portion in the predetermined rotational direction to cause the second rotating body to rotate in the predetermined rotational direction due to the spring body rotating in the predetermined rotational direction, and a spring-side load receiving portion that extends outward in the radial direction from the other end of the spring body and that is positioned at a side of the predetermined rotational direction with respect to a second rotating body-side pressing portion set in the second rotating body and faces the second rotating body-side pressing portion, the spring-side load receiving portion being pressed by the second rotating body-side pressing portion due to the second rotating body rotating in the predetermined rotational direction.

It is possible that the spring body has a coil shape.

It is possible that the spring body has a plate-spring shape.

According to the webbing retractor pertaining to the second aspect of the invention, the spring body that configures the clutch member is wound onto the outer peripheral portion of the first rotating body. The spring-side pressing portion extends from the one end of the spring body outward in the radial direction of the spring body. The spring-side pressing portion is positioned at the side of the direction opposite to the predetermined rotational direction with respect to the second rotating body-side load receiving portion set in the second rotating body, and faces the second rotating body-side load receiving portion. For this reason, the first rotating body rotates in the predetermined rotational direction that is the rotational direction of the clutch member when the spool has rotated in the retraction direction, due thereto, when the spring body rotates in the predetermined rotational direction, the spring-side pressing portion that rotates together with the spring body presses the second rotating body-side load receiving portion in the predetermined rotational direction. Due to this, the second rotating body rotates in the predetermined rotational direction.

On the other hand, the spring-side load receiving portion extends from the other end of the spring body outward in the radial direction of the spring body. The spring-side load receiving portion is positioned at the side of the predetermined rotational direction with respect to the second rotating body-side pressing portion set in the second rotating body, and faces the second rotating body-side pressing portion. For this reason, the third rotating body inertially rotates in the predetermined rotational direction; because of this, when the second rotating body rotates in the predetermined rotational direction together with the reducing balance spring, the second rotating body-side pressing portion of the second rotating body presses the spring-side load receiving portion in the predetermined rotational direction. Because of this, the pressure contact of the spring body with respect to the first rotating body is eased and the friction between the first rotating body and the spring body is decreased.

In this state, the spring body can easily rotate with respect to the first rotating body, so the second rotating body can easily relatively rotate with respect to the first rotating body. Due to this, even if the third rotating body rotates due to inertia in the predetermined rotational direction, the reducing balance spring and the second rotating body rotate together with the third rotating body, and relative displacement between the one end and the other end of the reducing balance spring does not arise or relative displacement between the one end and the other end of the reducing balance spring is suppressed. Due to this, the load on the reducing balance spring can be alleviated without increasing cost and weight.

A webbing retractor pertaining to a third aspect of the invention is the webbing retractor pertaining to the second aspect, wherein a clutch stopper is disposed in the second rotating body, the clutch stopper facing, in a central axis direction of the second rotating body, at least one of the spring-side pressing portion or the spring-side load receiving portion, and the clutch stopper interfering with the at least one of the spring-side pressing portion or the spring-side load receiving portion to regulate displacement of the at least one of the spring-side pressing portion or the spring-side load receiving portion along the central axis direction.

According to the webbing retractor pertaining to the third aspect, the clutch stopper is disposed in the second rotating body. The clutch stopper is disposed to face, along the direction of the central axis of the second rotating body, at least either one of the spring-side pressing portion and the spring-side load receiving portion (for example, the clutch stopper is disposed at a central axis direction side portion). If the clutch member tries to displace in the direction of the central axis of the second rotating body, the clutch stopper interferes with the spring-side pressing portion or the spring-side load receiving portion. Due to this, the displacement of the clutch member along the direction of the central axis of the second rotating body is regulated.

In the webbing retractor pertaining to the third aspect of the invention, it is possible that the second rotating body has ring shape, and the clutch member is arranged inside the second rotating body, and the spring-side pressing portion and the spring-side load receiving portion are arranged inside an accommodating section that opens at an inner peripheral portion of the second rotating body.

Further, in the webbing retractor it is possible that the second rotating body-side load receiving portion and the second rotating body-side pressing portion are wall portions, directing a circumferential direction of the second rotating body, of the accommodating section.

As described above, the burden on the reducing balance spring can be alleviated without increasing cost and weight.

BRIEF DESCRIPTION OF THE DRAWINGS

Embodiments of the invention will be described in detail with reference to the following figures, wherein.

DETAILED DESCRIPTION OF THE INVENTION

Configuration of First Embodiment

Figure 1:
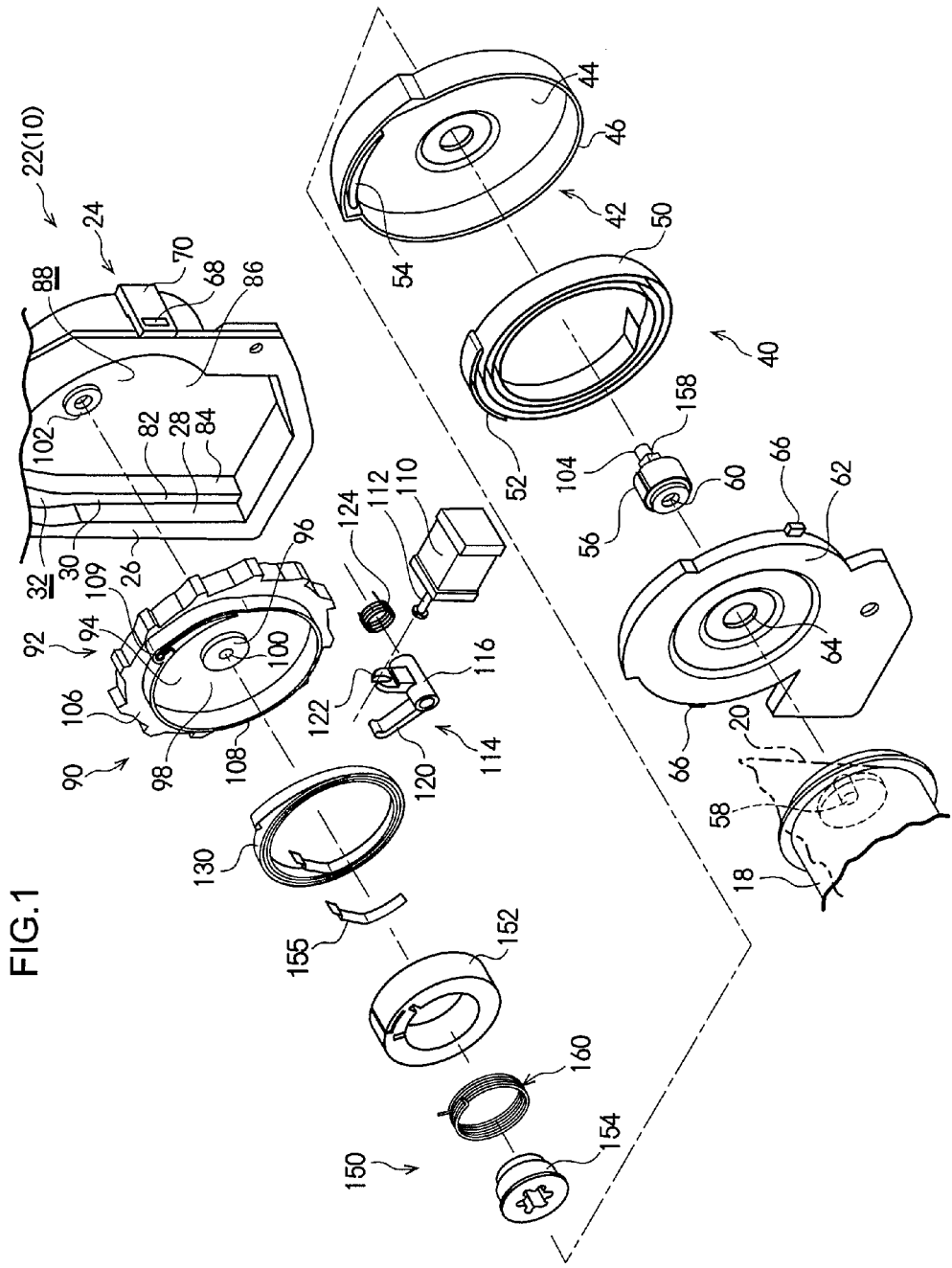
FIG. 1 is an exploded perspective view showing the configurations of main portions of a webbing retractor pertaining to a first embodiment of the invention.

In FIG. 1, the configurations of main portions of a webbing retractor 10 pertaining to a first embodiment of the invention are shown by an exploded perspective view.

As shown in FIG. 1, the webbing retractor 10 is equipped with a spool 18. The spool 18 is disposed between a pair of leg plates that configure a frame not shown in the drawings. The lengthwise direction proximal (base) end side of webbing 20 formed in the shape of a long band is caught on the spool 18. When the spool 18 rotates in a retraction (winding) direction, which is one direction about its axis, the webbing 20 is retracted (wound) from its lengthwise direction proximal end side onto the outer peripheral portion of the spool 18. When the webbing 20 is pulled toward its distal (tip) end side, the webbing 20 retracted on the spool 18 is withdrawn (pulled out) from the spool 18 and the webbing retractor 10 rotates in a withdrawal (pulled out) direction, which is the opposite of the retraction direction.

A case 24 that configures a tension reducer 22 is disposed on one axial direction side of the spool 18. The case 24 is equipped with a base portion 26 that is shaped like a plate. The base portion 26 is secured (fixed) to the frame by fastening-and-fixing members such as a screw or fitting-and-fixing members such as a stud pin. A hole with a predetermined shape is formed in the base portion 26, and a peripheral wall 28 that is shaped like a loop along the edge of the hole is formed in the base portion 26. A middle wall 30 is formed continuously from the peripheral wall 28 on the end portion of the peripheral wall 28 on the opposite side of the base portion 26 side. The middle wall 30 is shaped like a plate whose thickness direction is along the thickness direction of the base portion 26. The space surrounded by the peripheral wall 28 on the base portion 26 side further than the middle wall 30 is a retracting spring unit accommodating portion 32.

A retracting spring unit 40 is placed inside the retracting spring unit accommodating portion 32. The retracting spring unit 40 is equipped with a spring cover 42 that serves as a holder. The spring cover 42 is equipped with a bottom wall 44 that is shaped like a flat plate. A peripheral wall 46 is disposed upright from the outer peripheral portion of the bottom wall 44. Overall the spring cover 42 is shaped like a box having one end that is open. The outer peripheral shape of the spring cover 42 is slightly smaller than the inner peripheral shape of the retracting spring unit accommodating portion 32 (that is, the inner peripheral shape of the peripheral wall 28). The spring cover 42 is fitted inside the retracting spring unit accommodating portion 32 in a state in which the spring cover 42 is stopped from turning with respect to the case 24.

A retracting spring 50 is disposed inside the spring cover 42. The retracting spring 50 is configured by a power spring (flat spiral spring) whose orientation from the spiral direction outside to the spiral direction inside is the withdrawal direction. In the neighborhood of the spiral direction outside end portion of the retracting spring 50, the retracting spring 50 is folded back in the opposite direction, so that a catch portion 52 is formed. The catch portion 52 is caught on a catch wall 54 that is disposed upright from the bottom wall 44. The spiral direction inside end portion of the retracting spring 50 is caught, as a coupling member, on the outer peripheral portion of an adapter 56 that configures a rotation transmitting member.

The adapter 56 is formed in the shape of a cylinder that is substantially coaxial with respect to the spool 18. A fitting hole 60 is formed in the end portion of the adapter 56 that opposes the one axial direction end portion of the spool 18. A coupling shaft portion 58 that is formed projecting from the spool 18 coaxially with respect to the spool 18 fits into the fitting hole 60. The spool 18 and the adapter 56 are connected to each other in a state in which relative rotation of the adapter 56 with respect to the spool 18 is impossible as a result of the coupling shaft portion 58 fitting into the fitting hole 60.

For this reason, when the webbing 20 is pulled toward its distal end side and the spool 18 is caused to rotate in the withdrawal direction, the spiral direction inside end portion of the retracting spring 50 relatively rotates in the withdrawal direction with respect to the spiral direction outside end portion of the retracting spring 50. When the retracting spring 50 becomes wound in this way, the retracting spring 50 urges the spool 18 in the retraction direction. The greater the amount of relative rotation of the spiral direction inside end portion of the retracting spring 50 in the withdrawal direction with respect to the spiral direction outside end portion of the retracting spring 50, the more the urging force (that is, the retraction urging force) increases.

A seat 62 that is shaped like a plate is disposed on the open side of the spring cover 42 in which the retracting spring 50 is accommodated. A through hole 64 is formed in the seat 62, and the adapter 56 passes through the through hole 64. Further, fitting pieces 66 extend from parts of the outer periphery of the seat 62. The fitting pieces 66 are fitted into the frame, whereby the seat 62 is integrally attached to the frame and the open side of the retracting spring unit accommodating portion 32 and the open side of the spring cover 42 are closed.

A hole portion 82 with a predetermined shape is formed in the middle wall 30. Moreover, a peripheral wall 84 along the edge of the hole portion 82 is formed from the middle wall 30. The end portion of the peripheral wall 84 on the opposite side of the middle wall 30 side is closed by a bottom wall 86. The inside of the peripheral wall 84 on the middle wall 30 side further than the bottom wall 86 is a reducing spring unit accommodating portion 88. A reducing spring unit 90 is accommodated in the reducing spring unit accommodating portion 88. The reducing spring unit 90 is equipped with a ratchet gear 92 that serves as a third rotating body.

The ratchet gear 92 is equipped with a bottom wall portion 94 that is shaped like a plate whose thickness direction is along the thickness direction of the bottom wall 86. A boss 96 is formed in the center of the bottom wall portion 94. The boss 96 is formed in the shape of a bottomed cylinder that opens toward the bottom wall 86 side. One side further than the axial direction intermediate portion of the boss 96 (the open side of the boss 96) projects toward the bottom wall 86 side of the bottom wall portion 94. The other side further than the axial direction intermediate portion of the boss 96 (a bottom portion 98 side of the boss 96) projects toward the opposite side of the bottom wall 86 side of the bottom wall portion 94.

The inner peripheral shape of the boss 96 is formed in the shape of a circle that is coaxial with respect to the outer peripheral shape that is circular. Moreover, a through hole 100 that is coaxial with respect to the inner peripheral shape of the boss 96 is formed in the bottom portion 98. The through hole 100 not only penetrates the bottom portion 98 but is given the shape of a truncated cone whose inner diameter dimension gradually becomes smaller toward the open end of the bottom portion 98.

A support portion 102 is formed in the bottom wall 86 of the case 24 in correspondence to the boss 96. The support portion 102 is formed in the shape of a cylinder that is coaxial with respect to the spool 18 in a state in which the case 24 has been attached to the frame. However, the distal end side of the support portion 102 has the shape of a truncated cone whose outer diameter dimension gradually becomes smaller toward the distal end in correspondence to the through hole 100 formed in the bottom portion 98 of the boss 92. Taking the support portion 102 as an axis in a state in which the ratchet gear 92 has been placed inside the reducing spring unit accommodating portion 88, the boss 96 is supported on the outside of the support portion 102 in such a way that the boss 96 freely rotates, and the ratchet gear 92 is supported by the boss 96 in such a way that the ratchet gear 92 freely rotates. Moreover, a shaft portion 104 that is formed integrally with the adapter 56 in the shape of a cylinder coaxially with respect to the spool 18 enters the inside of the boss 96. The shaft portion 104 (that is, the adapter 56) is supported in such a way that it freely rotates.

A ratchet portion 106 is formed on the outer peripheral portion of the bottom wall portion 94. The ratchet gear 92 is given the shape of a tray (the shape of a bottomed cylinder whose axial direction dimension is relatively short) overall. A solenoid 110 that serves as a regulating member is disposed on the radial direction outside of the ratchet portion 106 (in the present embodiment, under the ratchet portion 106). The solenoid 110 is electrically connected to a battery installed in a vehicle via an ECU that serves as a control unit. Moreover, the ECU is electrically connected to a buckle switch disposed in a buckle device that configures a seat belt device together with the webbing retractor 10. When the buckle switch detects that a tongue plate disposed on the webbing 20 has been attached to the buckle device, the ECU energizes the solenoid 110. When the solenoid 110 is energized in this way, the solenoid 110 forms a magnetic field.

Further, a plunger 112 is disposed in the solenoid 110. The plunger 112 is formed in the shape of a rod by a magnetic body. The lengthwise direction proximal end side of the plunger 112 is inside the solenoid 110. When the solenoid 110 is energized as described above, the plunger 112 is further pulled inside the solenoid 110 by the magnetic field formed by the solenoid 110. A pawl 114 is disposed on the distal end side of the plunger 112. The pawl 114 is equipped with a cylinder portion 116. The axial direction of the cylinder portion 116 is given the same orientation as the axial direction of the spool 18. A shaft portion having at least one end held in at least either one of the seat 62 and the case 42 passes through the cylinder portion 116, and the pawl 114 is supported in such a way as to be rotatable about the shaft portion. A rotation regulating piece 120 extends from part of the outer periphery of the cylinder portion 116.

When the pawl 114 rotates in an engagement direction, which is one direction about the shaft portion, the distal end of the rotation regulating piece 120 approaches the outer peripheral portion of the ratchet portion 106 and engages with ratchet teeth of the ratchet portion 106. In a state in which the distal end of the rotation regulating piece 120 has engaged with the ratchet teeth of the ratchet portion 106 in this way, the rotation of the ratchet gear 92 in the retraction direction is regulated. Further, a coupling piece 122 extends from part of the outer periphery of the cylinder portion 116. The pawl 114 is connected to the plunger 112 by the coupling piece 122. When the plunger 112 is pulled into the solenoid 110, the coupling piece 122 is pulled by the plunger 112 and the pawl 114 rotates in the engagement direction about the shaft portion. Further, one end of a return spring 124 is caught on the pawl 114, and the pawl 114 is urged in the opposite direction of the engagement direction. Unless the solenoid 110 is energized, the pawl 114 is maintained in a state in which the distal end side of the rotating regulating piece 120 is away from the outer peripheral portion of the ratchet portion 106.

The ratchet gear 92 is equipped with a peripheral wall 108. The peripheral wall 108 is disposed upright in the shape of a cylinder from the bottom portion 98 toward the spring cover 42 side. A reducing balance spring 130 is placed inside the peripheral wall 108. The reducing balance spring 130 is configured by a power spring whose urging force is weaker than the urging force of the retracting spring 50 and whose orientation from the spiral direction outside to the spiral direction inside is the retraction direction.

Figure 3:
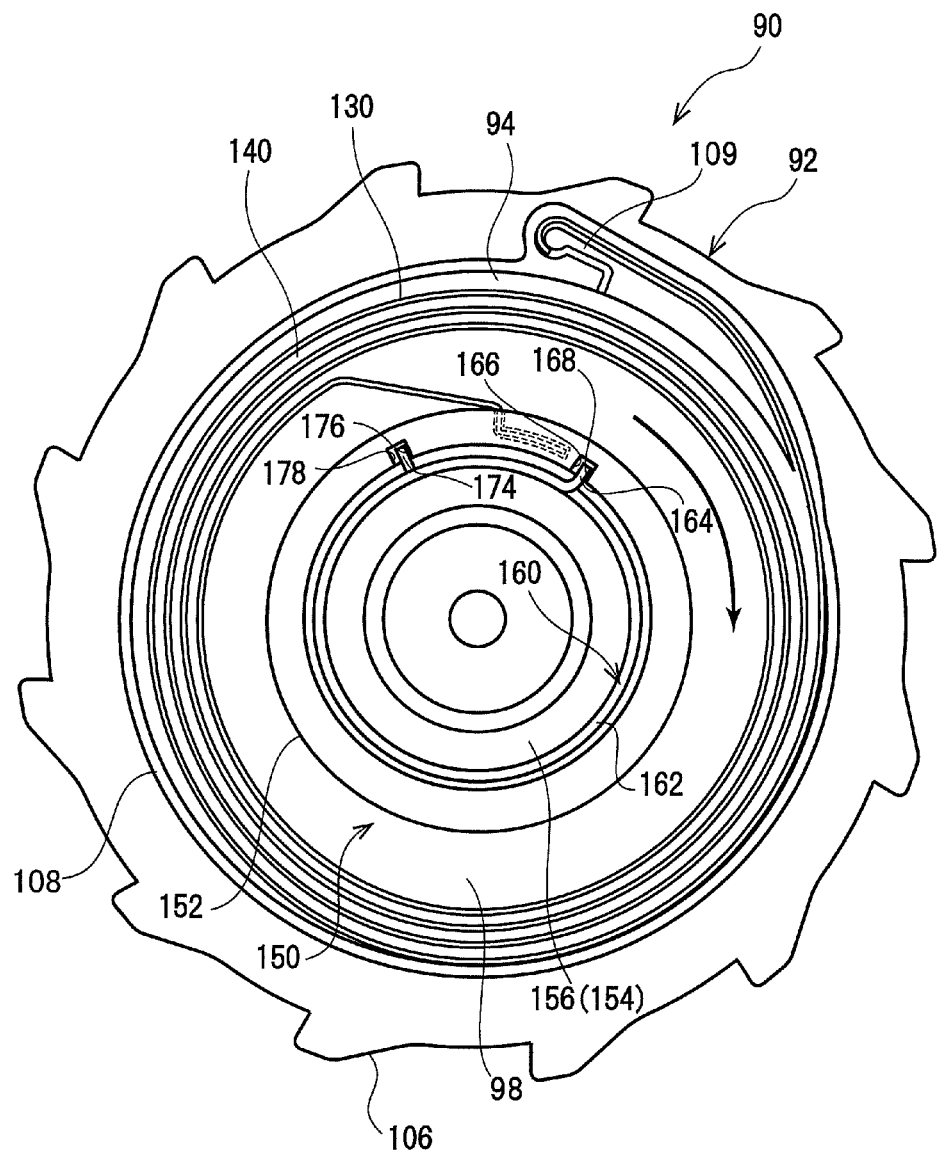
FIG. 3 is a side view of first to third rotating bodies and the clutch member.

As shown in FIG. 3, a catch wall 109 is disposed upright from the bottom portion 98 in correspondence to the spiral direction outside end portion of the reducing balance spring 130. The catch wall 109 is formed in the neighborhood of part of the peripheral wall 108 inside the peripheral wall 108. The neighborhood of the spiral direction outside end portion of the reducing balance spring 130 enters a gap between the catch wall 109 and the peripheral wall 108 and is caught on the catch wall 109.

A clutch 150 is disposed even more inside a portion of the spiral direction innermost layer of the reducing balance spring 130 (the inside-most portion of the spiral). The ratchet 150 is equipped with a ring 152 that serves as a second rotating body. The ring 152 is formed in the shape of a cylinder overall. The ring 152 is supported, in such a way that it is relatively rotatable coaxially with respect to the ratchet gear 92, on the boss 96 formed on the bottom wall portion 94 of the ratchet gear 92.

The shaft portion 104 of the adapter 56 penetrates the ring 152, and the ring 152 is supported on the shaft portion 104 in such a way that the ring 152 freely relatively rotates coaxially with respect to the shaft portion 104. Further, a catch groove 153 is formed in the ring 152. When seen in the axial direction of the ring 152, the catch groove 153 is shaped like an L-shaped hook, part of which has a lengthwise direction along the circumferential direction of the ring 152 and which then extends outward in the radial direction of the ring 152 from the withdrawal direction side end portion of this section. The catch groove 153 is open at both axial direction end surfaces of the ring 152, and the distal end of the section of the catch groove 153 that is bent outward in the radial direction of the ring 152 is open at the outer peripheral surface of the ring 152.

The spiral direction inside end portion of the reducing balance spring 130 is inserted into and caught in the catch groove 41. One end of a support member 155 is also inserted into and caught in the catch groove 41. The other end side of the support member 155 extends from the catch groove 153 to between the spiral direction most-inside layer (the first layer) and the second layer of the reducing balance spring 130.

When the ratchet gear 92 rotates in the retraction direction due to the urging force of the reducing balance spring 130, a circumferential direction load acts in the neighborhood of the spiral direction inside end portion of the reducing balance spring 130, but due to the support member 155 abutting the neighborhood of the spiral direction inside end portion, the support member 155 reinforces the neighborhood of the spiral direction inside end portion and prevents or suppresses buckling and so forth in the neighborhood of the spiral direction inside end portion.

Figure 2:
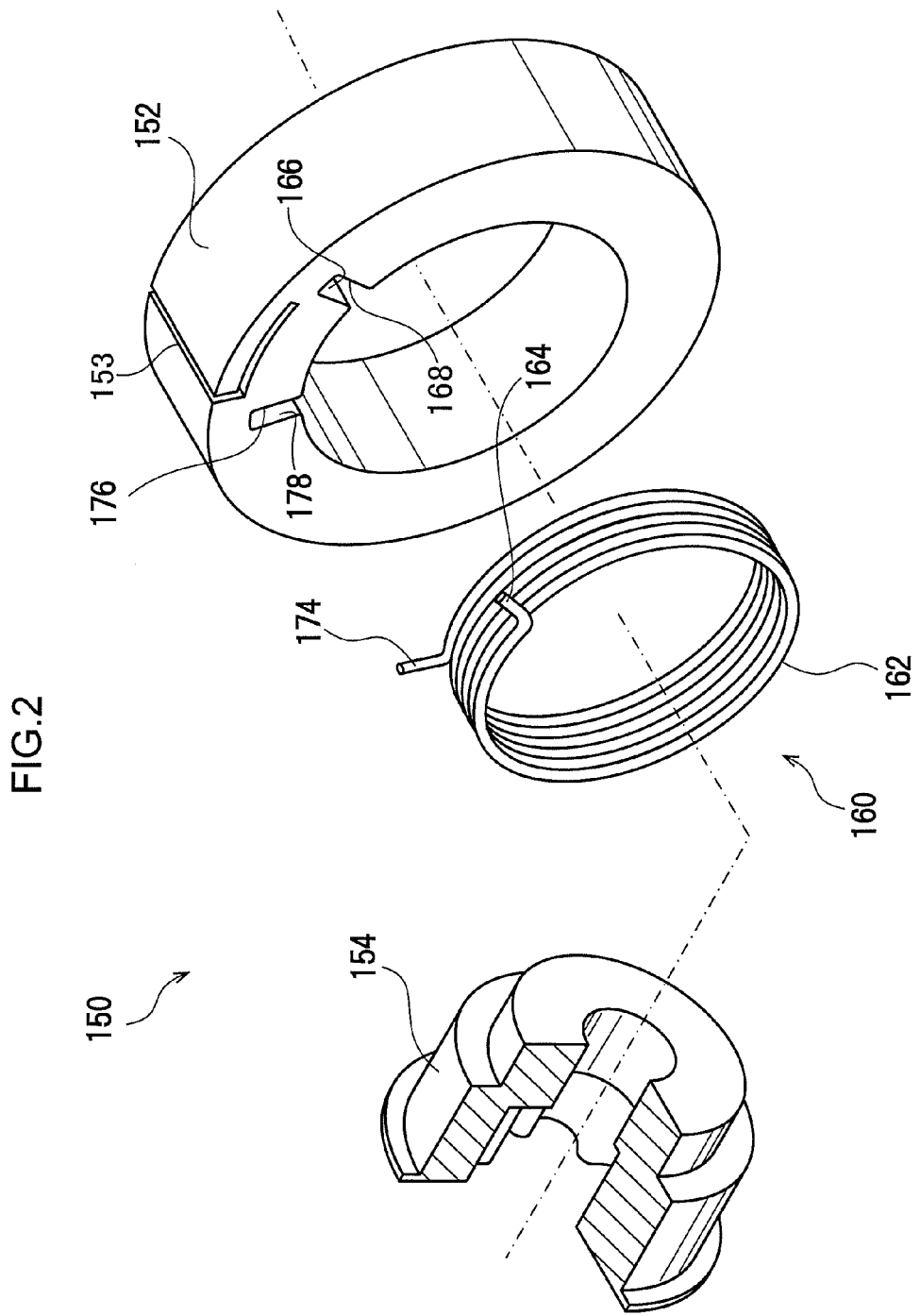
FIG. 2 is an exploded perspective view showing the configuration of a clutch member of the webbing retractor pertaining to the first embodiment of the invention.

Further, as shown in FIG. 1 and FIG. 2, the clutch 150 is equipped with a clutch wheel 154 that serves as a first rotating body. The outer peripheral shape of the clutch wheel 154 is circular. The clutch wheel 154 enters the inside of the ring 152 in a coaxial state with respect to the support portion 102, and the clutch wheel 154 is assembled to the ring 152 in this state. Further, a noncircular detent portion 158 intervened between the body section of the adapter 56 and the support portion 102 penetrates the clutch wheel 154, and the relative rotation of the clutch wheel 154 with respect to the adapter 56 is regulated.

A clutch spring 160 that serves as a clutch member is placed inside the ring 152 and outside the clutch wheel 154. The clutch spring 160 is formed by a springy wire whose cross-sectional shape is circular overall. However, the cross-sectional shape of the wire configuring the clutch spring 160 is not limited to being circular and may also be quadrilateral, for example. The clutch spring 160 is equipped with a spring body 162. The spring body 162 is formed in the shape of a coil whose axial direction is the same orientation as the axial direction of the spool 18. A spring-side pressing portion 164 extends from one end of the spring body 162 outward in the radial direction of the spring body 162. A pressing portion accommodating portion 166 is formed in the ring 152 in correspondence to the spring-side pressing portion 164.

The pressing portion accommodating portion 166 is formed in the shape of a groove that opens at the inner peripheral portion of the ring 152 and opens at both axial direction end portions of the ring 152. The open width dimension of the pressing portion accommodating portion 166 along the circumferential direction of the ring 152 is set larger than the outer diameter dimension of the section configuring the spring-side pressing portion 164 in the wire forming the clutch spring 160. The spring-side pressing portion 164 can be accommodated inside the pressing portion accommodating portion 166 in a state in which there are gaps between both wall portions of the pressing portion accommodating portion 166 facing the circumferential direction of the ring 152 and the spring-side pressing portion 164.

Of both wall portions of the pressing portion accommodating portion 166 facing the circumferential direction of the ring 152, the wall portion positioned in the retraction direction with respect to the spring-side pressing portion 164 is a ring-side load receiving portion 168 that serves as a second rotating body-side load receiving portion (namely, the spring-side pressing portion 164 is positioned at a side of a direction opposite to the retraction direction with respect to the ring-side load receiving portion 168, and faces the ring-side load receiving portion 168). When the clutch spring 160 rotates in the retraction direction, the ring-side load receiving portion 168 is pressed in the retraction direction by the spring-side pressing portion 164.

A spring-side load receiving portion 174 extends from the other end of the spring body 162 outward in the radial direction of the spring body 162. A load receiving portion accommodating portion 176 is formed in the ring 152 in correspondence to the spring-side load receiving portion 174.

The load receiving portion accommodating portion 176 is formed in the shape of a groove that opens at the inner peripheral portion of the ring 152 and opens at both axial direction end portions of the ring 152. The open width dimension of the load receiving portion accommodating portion 176 along the circumferential direction of the ring 152 is set larger than the outer diameter dimension of the section configuring the spring-side load receiving portion 174 in the wire forming the clutch spring 160. The spring-side load receiving portion 174 can be accommodated inside the load receiving portion accommodating portion 176 in a state in which there are gaps between both wall portions of the load receiving portion accommodating portion 176 facing the circumferential direction of the ring 152 and the spring-side load receiving portion 174.

Of both wall portions of the load receiving portion accommodating portion 176 facing the circumferential direction of the ring 152, the wall portion positioned in the withdrawal direction with respect to the spring-side load receiving portion 174 is a ring-side pressing portion 178 that serves as a second rotating body-side pressing portion (namely, the spring-side load receiving portion 174 is positioned at a side of the retraction direction with respect to the ring-side pressing portion 178 and faces the ring-side pressing portion 178). When the ring 152 rotates in the retraction direction, the ring-side pressing portion 178 presses the spring-side load receiving portion 174 in the retraction direction.

Further, the positions where the spring-side pressing portion 164 and the spring-side load receiving portion 174 are formed on the clutch spring 160 and the positions where the pressing portion accommodating portion 166 and the load receiving portion accommodating portion 176 are formed in the ring 152 are set in such a way that, if the spring-side pressing portion 164 comes into contact with the ring-side load receiving portion 168 in a state in which the spring body 162 is not wound (tightened), the spring-side load receiving portion 174 is away from the wall portion on the opposite side of the ring-side pressing portion 178 among both wall portions of the load receiving portion accommodating portion 176 and further in such a way that, if the spring-side load receiving portion 174 comes into contact with the ring-side pressing portion 178, the spring-side pressing portion 164 is away from the wall portion on the opposite side of the ring-side load receiving portion 168 among both wall portions of the pressing portion accommodating portion 166.

Moreover, the load receiving portion accommodating portion 176 and the pressing portion accommodating portion 166 are set in such a way that their depth dimensions from their open ends in the inner peripheral portion of the ring 152 to their bottom portions on the radial direction outside of the ring 152 are deeper than the longer of the extension dimensions of the spring-side pressing portion 164 or the spring-side load receiving portion 174 from the spring body 162.

Operation and Effects of First Embodiment

Next, the operation and effects of the present embodiment will be described.

In the webbing retractor 10, when an occupant seated in a seat of the vehicle pulls the webbing 20 toward its distal end side and withdraws the webbing 20 from the spool 18 in order to put the webbing 20 on his or her body, the spool 18 rotates in the withdrawal direction. When the spool 18 rotates in the withdrawal direction, the adapter 56 rotates in the withdrawal direction and causes the spiral direction inside end portion of the retracting spring 50 to rotate in the withdrawal direction with respect to the spiral direction outside end portion. Due to this, the retracting spring 50 winds (tightens), and the urging force with which the retracting spring 50 urges the spool 18 in the retraction direction via the adapter 56 gradually increases.

Further, the clutch wheel 154 rotates in the withdrawal direction as a result of the adapter 56 rotating in the withdrawal direction in this way. The clutch spring 160 is in sliding contact with the outer peripheral portion of the clutch wheel 154, so when the clutch spring 160 rotates in the withdrawal direction together with the clutch wheel 154 due to the friction between the outer peripheral portion of the clutch wheel 154 and the clutch spring 160, the ring 152 in which the one end of the clutch spring 160 is caught rotates in the withdrawal direction.

The spiral direction inside end portion of the reducing balance spring 130 is caught in the ring 152, so when the ring 152 rotates in the withdrawal direction, the spiral direction inside end portion of the reducing balance spring 130 rotates in the withdrawal direction. The spiral direction outside end portion of the reducing balance spring 130 is caught on the catch wall 109 of the reducing spring unit 90, so when the spiral direction inside end portion of the reducing balance spring 130 rotates in the withdrawal direction, the ratchet gear 92 rotates in the withdrawal direction due to the friction between the reducing balance spring 130 and the inner peripheral portion of the ratchet portion 106. That is, in this state, even if the rotational force of the spool 18 in the withdrawal direction is to travel to the ratchet gear 92, the ratchet gear 92 would only rotate in the withdrawal direction, and no particular change arises in the reducing balance spring 130.

Next, when the webbing 20 is sufficiently withdrawn and placed across the body of the occupant and the tongue disposed on the webbing 20 is attached to the buckle device, the ECU energizes the solenoid 110 on the basis of an electric signal from the buckle switch disposed in the buckle device. When the plunger 112 is pulled into the solenoid 110 by the magnetic field formed as a result of energized solenoid 110, the pawl 114 whose coupling piece 122 is engaged with the distal end side of the plunger 112 rotates in the engagement direction counter to the urging force of the return spring 124. Due to this, when the rotation regulating piece 120 of the pawl 114 engages with the ratchet teeth formed on the outer peripheral portion of the ratchet portion 106, the rotation of the ratchet gear 92 in the retraction direction is regulated.

In this state, when the pulling force that the occupant had applied to the webbing 20 in order to withdraw the webbing 20 is ceased (when the occupant stops pulling the webbing 20), the retracting spring 50 uses its urging force to cause the spool 18 to rotate in the retraction direction via the adapter 56 and eliminates the slack in the webbing 20. When the clutch wheel 154 rotates in the retraction direction as a result of the adapter 56 being caused to rotate in the retraction direction, the clutch spring 160 that is in sliding contact with the outer peripheral portion of the clutch wheel 154 rotates in the retraction direction due to the friction between it and the outer peripheral portion of the clutch wheel 154.

Figure 4:
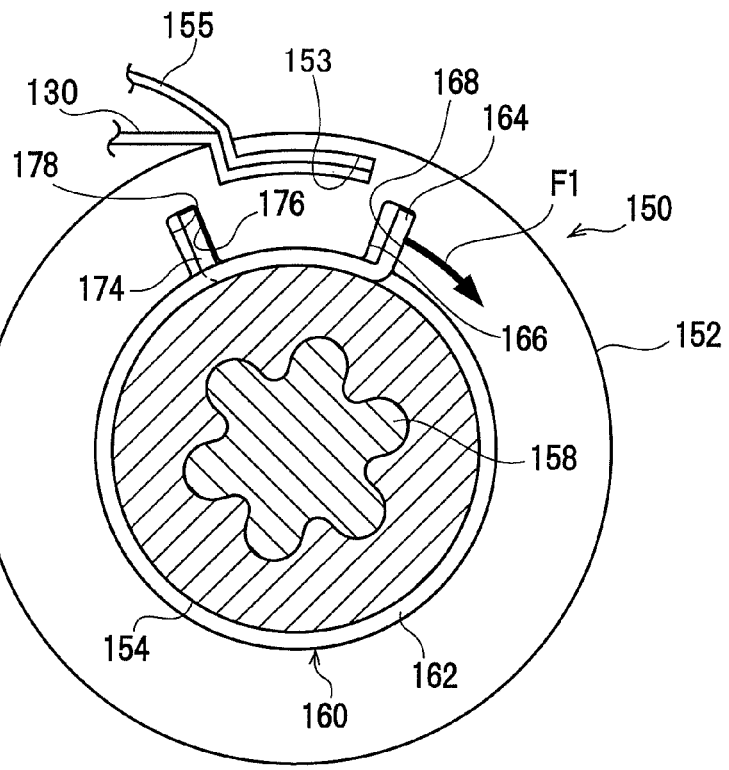
FIG. 4 is a schematic side view showing a state in which a spring-side pressing portion is pressing a rotating body-side load receiving portion.

Due to this, when the clutch spring 160 rotates in the retraction direction together with the clutch wheel 154, the ring-side load receiving portion 168 of the ring 152 is pressed (pushed) in the direction of arrow F1 (that is, the retraction direction) in FIG. 4 by the spring-side pressing portion 164 of the clutch spring 160. Due to this, when the ring 152 rotates in the retraction direction, the spiral direction inside end portion of the reducing balance spring 130 that is caught in the ring 152 rotates in the retraction direction.

Further, when the clutch spring 160 rotates in the retraction direction as described above, the wound-tightness of the clutch spring 160 with respect to the clutch wheel 154 is loosened. However, the urging force of the clutch spring 160 is set in such a way that, even in a state in which the tightness has loosened, the rotational torque that the clutch spring 160 receives due to the friction between it and the outer peripheral portion of the clutch wheel 154 becomes greater than the torque of the reducing balance spring 130. For this reason, even if the tightness of the clutch spring 160 with respect to the clutch wheel 154 is loosened as a result of the clutch spring 160 rotating in the retraction direction, the clutch spring 160 rotates in the retraction direction, and due to this the spiral direction inside end portion of the reducing balance spring 130 rotates in the retraction direction.

The spiral direction outside end portion of the reducing balance spring 130 is caught on the catch wall 109 of the reducing spring unit 90, and the rotation of the ratchet gear 92 in the retraction direction is regulated as described above. For this reason, if the spiral direction inside end portion of the reducing balance spring 130 rotates in the retraction direction in this state, the spiral direction outside end portion of the reducing balance spring 130 does not rotate.

The orientation of the reducing balance spring 130 from the spiral direction outside to the spiral direction inside is the retraction direction. For this reason, when the spiral direction inside end portion of the reducing balance spring 130 rotates in the retraction direction relatively with respect to the spiral direction outside end portion, the reducing balance spring 130 is wound-tightened and the urging force with which it tries to cause the spiral direction inside end portion to rotate in the withdrawal direction increases. The urging force of the reducing balance spring 130 that has arisen (increased) in this way counters the force that tries to cause the ring 152 on which the spiral direction inside end portion of the reducing balance spring 130 is caught to rotate in the retraction direction, that is, the urging force of the retracting spring 50.

Some or all of the urging force of the retracting spring 50 is offset (counterbalanced) by the urging force of the reducing balance spring 130 in this way, whereby the force that causes the spool 18 to rotate in the retraction direction decreases, and the force that pulls the webbing 20 put on the body of the occupant to the proximal end side of the webbing 20 decreases. Due to this, the tightening (static tightening force) that the webbing 20 applies to the occupant is alleviated.

Further, when the body of the occupant on which the webbing 20 has been put moves, the webbing 20 is withdrawn. When the spool 18 rotates in the withdrawal direction as a result of the webbing 20 being withdrawn, the retracting spring 50 is wound-tightened and the force with which it urges the spool 18 in the retraction direction, and therefore the force with which it pulls the webbing 20 and tightens the body of the occupant, increases. However, in the webbing retractor 10, the urging force of the reducing balance spring 130 offsets the urging force of the retracting spring 50, so an increase in the tightening force (dynamic tightening force) of the webbing 20 when the body of the occupant has moved and pulled the webbing 20 can be suppressed.

Moreover, when the urging force of the reducing balance spring 130 becomes greater than the urging force of the clutch spring 160 due to the rotation of the ring 152 in the retraction direction resulting by the urging force of the retracting spring 50, the ring-side load receiving portion 168 of the pressing portion accommodating portion 166 presses (pushes) the spring-side pressing portion 164 of the clutch spring 160 toward the withdrawal direction side so loosening the wound-tightness of the spring body 162.

Due to this, the mechanical coupling between the clutch wheel 154 and the ring 152 by the clutch spring 160 is released until when the magnitude of the urging force of the reducing balance spring 130 becomes equal to or less than the magnitude of the urging force of the clutch spring 160, the ring 152 rotates in the withdrawal direction due to the urging force of the reducing balance spring 130. For this reason, the reducing balance spring 130 is not maintained with a state in which the reducing balance spring 130 is wound-tightened so as to exceed the magnitude of the urging force of the clutch spring 160. Due to this, the load acting on the reducing balance spring 130 can be alleviated and reduced.

When the occupant removes the tongue from the buckle device in order to take off the webbing 20, the ECU stops energizing the solenoid 110 on the basis of an electric signal from the buckle switch disposed in the buckle device. When the magnetic field around the solenoid 110 is ceased as a result of the energizing of the solenoid 110 being stopped, the pawl 114 rotates due to the urging force of the return spring 124, and the rotation regulating piece 120 moves away from the ratchet teeth formed on the outer peripheral portion of the ratchet portion 106. Due to this, when the regulation of the rotation of the ratchet gear 92 in the retraction direction is ceased, the reducing balance spring 130 uses its urging force to cause the ratchet gear 92 to rotate in the retraction direction.

When the ratchet gear 92 further inertially rotates in the retraction direction in a state in which the urging force of the reducing balance spring 130 has been substantially ceased, the ratchet gear 92 presses the ring 152 in the retraction direction via the reducing balance spring 130 and causes the ring 152 to rotate in the retraction direction.

Figure 5:
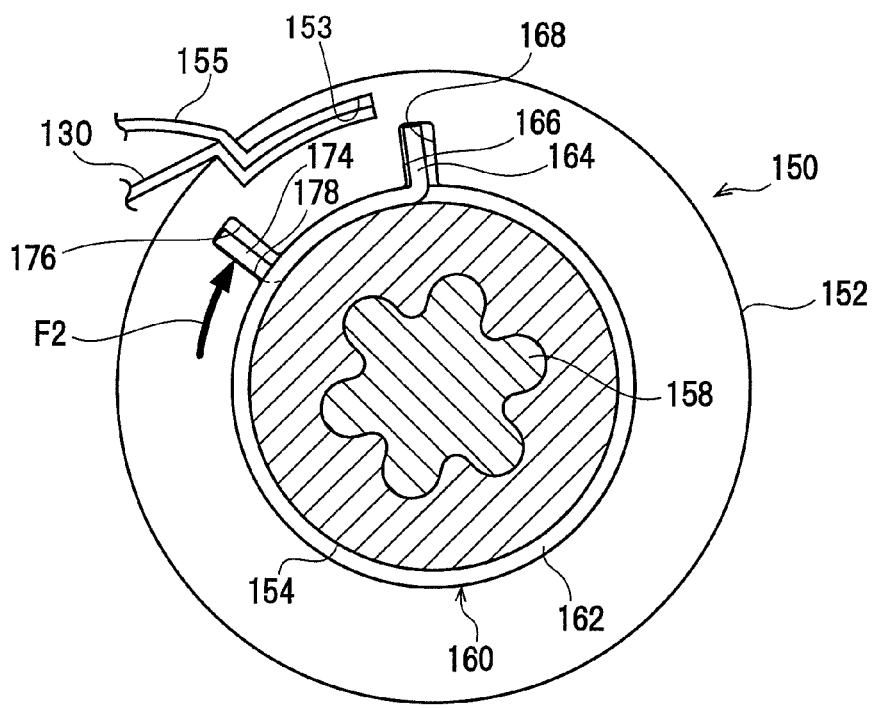
FIG. 5 is a schematic side view showing a state in which a rotating body-side pressing portion is pressing a spring-side load receiving portion.

When the ring 152 rotates in the retraction direction in this way, the ring-side pressing portion 178 presses (pushes) the spring-side load receiving portion 174 in the direction of arrow F2 (that is, the retraction direction) in FIG. 5. When the spring-side load receiving portion 174 is pressed in the retraction direction, the spring body 162 is loosened, and due to this the friction between the clutch spring 160 and the clutch wheel 154 decreases. Consequently, in this state, the clutch spring 160 can easily relatively rotate with respect to the clutch wheel 154.

For this reason, the ring 152 pressing the spring-side load receiving portion 174 of the clutch spring 160 also easily rotates due to that it receives the rotational force of the ratchet gear 92 inertially rotating in the retraction direction via the reducing balance spring 130. In this way, if the ratchet gear 92 rotates in the retraction direction due to inertia, the reducing balance spring 130 and the ring 152 rotate together with the ratchet gear 92, so even if the ratchet gear 92 rotates in the retraction direction due to inertia, the load acting on the reducing balance spring 130 can be alleviated.

Moreover, the only thing that is needed is for the load receiving portion accommodating portion 176 having the ring-side pressing portion 178 to be formed in the ring 152 and for the spring-side load receiving portion 174 to extend from the other end of the spring body 162.

Further, the load receiving portion accommodating portion 176 and the pressing portion accommodating portion 166 are set in such a way that their depth dimensions from their open ends in the inner peripheral portion of the ring 152 to their bottom portions on the radial direction outside of the ring 152 are deeper than the longer of the extension dimensions of the spring-side pressing portion 164 or the spring-side load receiving portion 174 from the spring body 162. For this reason, even if the axial direction of the clutch spring 160 is switched to the opposite orientation, the configuration that had been the spring-side pressing portion 164 until then becomes the spring-side load receiving portion 174, and the configuration that had been the spring-side load receiving portion 174 until then becomes the spring-side pressing portion 64. That is, in the present embodiment, there is no directionality in the assembly direction of the axial direction of the clutch spring 160, and the occurrence of assembly mistakes and so forth can be prevented.

Figure 6:
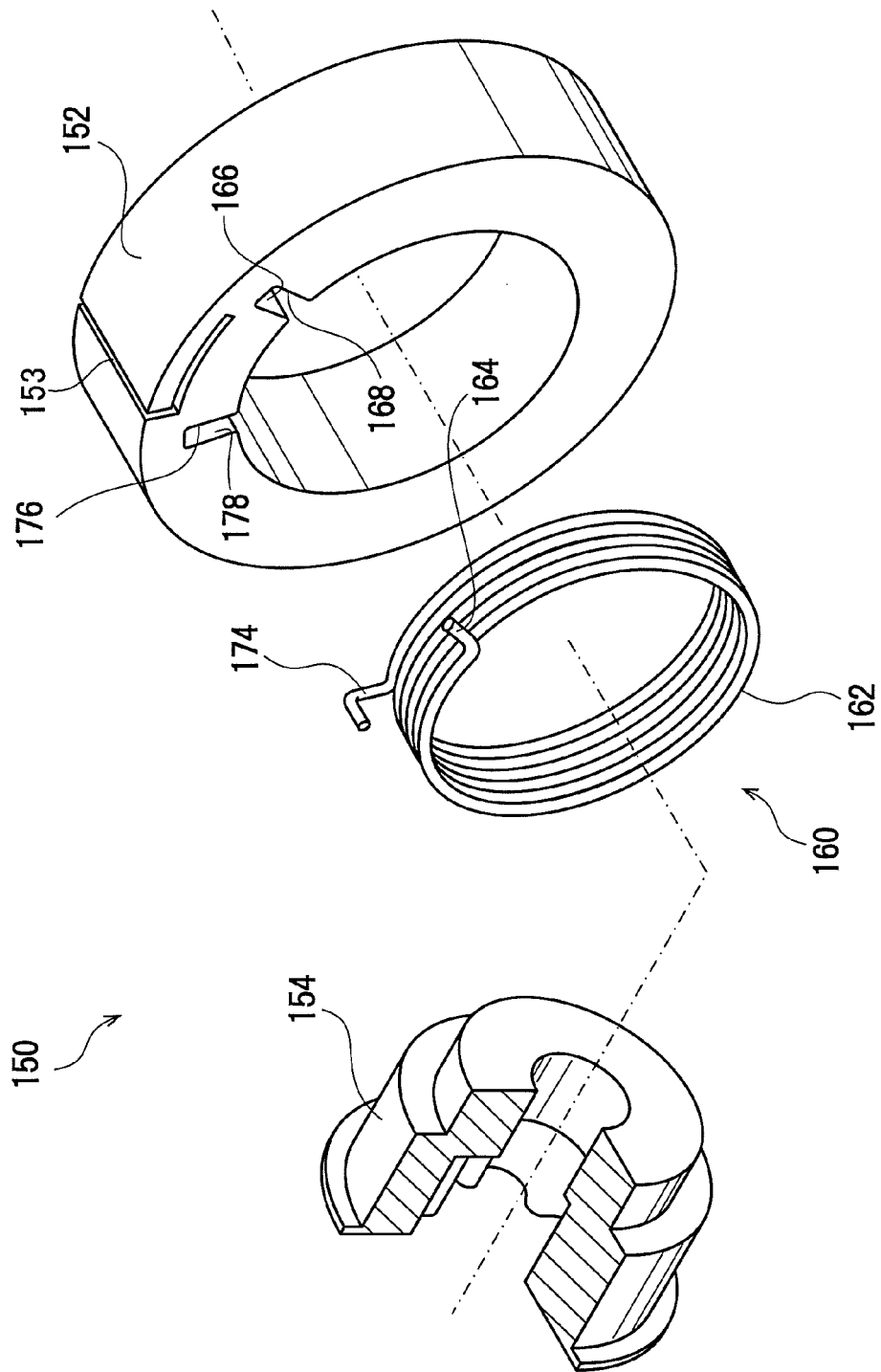
FIG. 6 is an exploded perspective view corresponding to FIG. 2 showing a modification of the clutch member.
Figure 7:
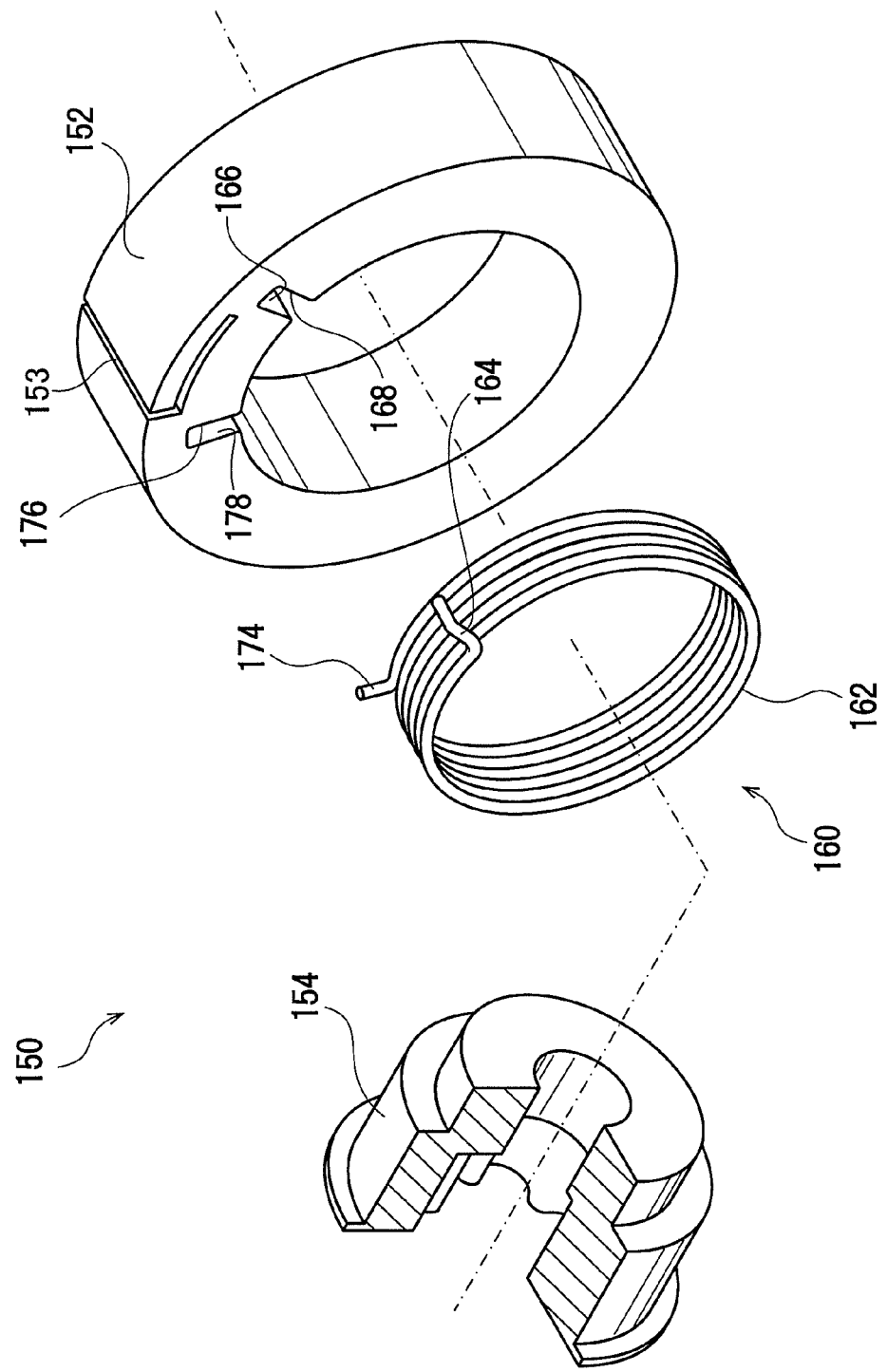
FIG. 7 is an exploded perspective view corresponding to FIG. 2 showing another modification of the clutch member.
Figure 8:
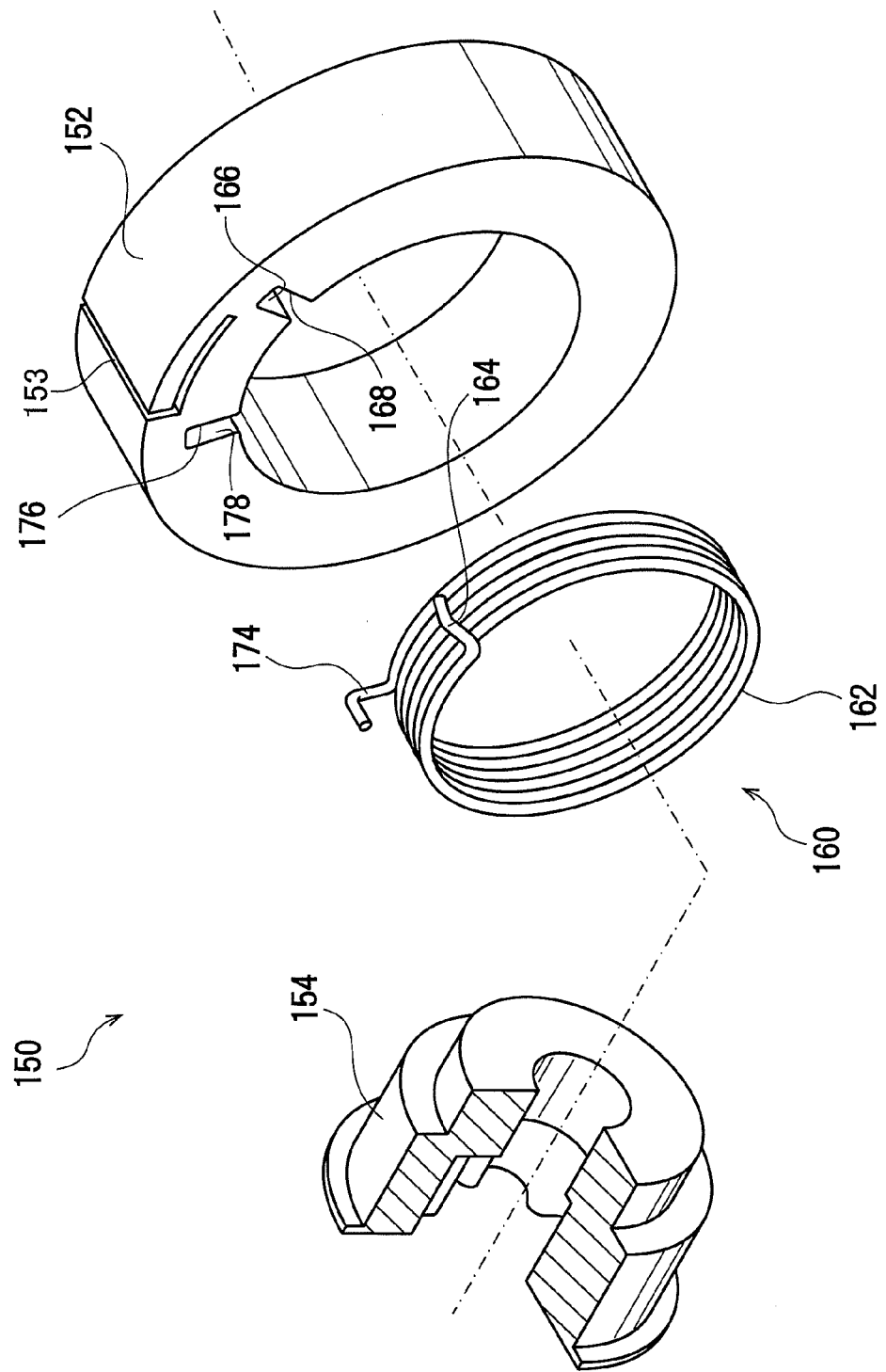
FIG. 8 is an exploded perspective view corresponding to FIG. 2 showing another modification of the clutch member.

In the present embodiment, the spring-side pressing portion 164 and the spring-side load receiving portion 174 simply extend outward in the radial direction of the spring body 162, but as shown in FIG. 6 to FIG. 8, at least either one of the spring-side load receiving portion 174 and the spring-side pressing portion 164 may also be bent in the shape of an L-shaped hook such that a portion from an extension direction intermediate portion to the distal end side is bent so as to be along the axial direction toward the axial direction center side of the spring body 162.

For example, if the spring-side load receiving portion 174 is bent in the shape of an L-shaped hook such that the portion from an extension direction intermediate portion to the distal end side is bent so as to be along the axial direction toward the axial direction center side of the spring body 162, the distal end side of the bent section in the spring-side load receiving portion 174 faces both wall portions (one of which is the ring-side pressing portion 178) facing the circumferential direction of the ring 152 in the load receiving portion accommodating portion 176 even on the axial direction center side of the ring 152. For this reason, the clutch spring 160 can be effectively prevented from coming out from the ring 152 and the clutch wheel 154, and circumferential direction misalignment of the clutch spring 160 with respect to the ring 152 and the clutch wheel 154 can be effectively prevented. A case where the spring-side pressing portion 164 is bent in the shape of an L-shaped hook such that a portion from an extension direction intermediate portion to the distal end side is bent so as to be along the axial direction toward the axial direction center side of the spring body 162 is also the same, so detailed description thereof will be omitted.

Moreover, in the present embodiment, the pressing portion accommodating portion 166 and the load receiving portion accommodating portion 176 are formed separately in the ring 152. However, as long as a configuration having the ring-side load receiving portion 168, which abuts the spring-side pressing portion 164 and receives the load F1 from the spring-side pressing portion 164, and the ring-side pressing portion 178, which abuts the spring-side load receiving portion 174 and applies the load F2 to the spring-side load receiving portion 174, the ring 152 may also be given a configuration where the pressing portion accommodating portion 166 and the load receiving portion accommodating portion 176 are not formed separately but where one groove that accommodates both the spring-side pressing portion 164 and the spring-side load receiving portion 174, serving as both the pressing portion accommodating portion 166 and the load receiving portion accommodating portion 176.

Figure 9:
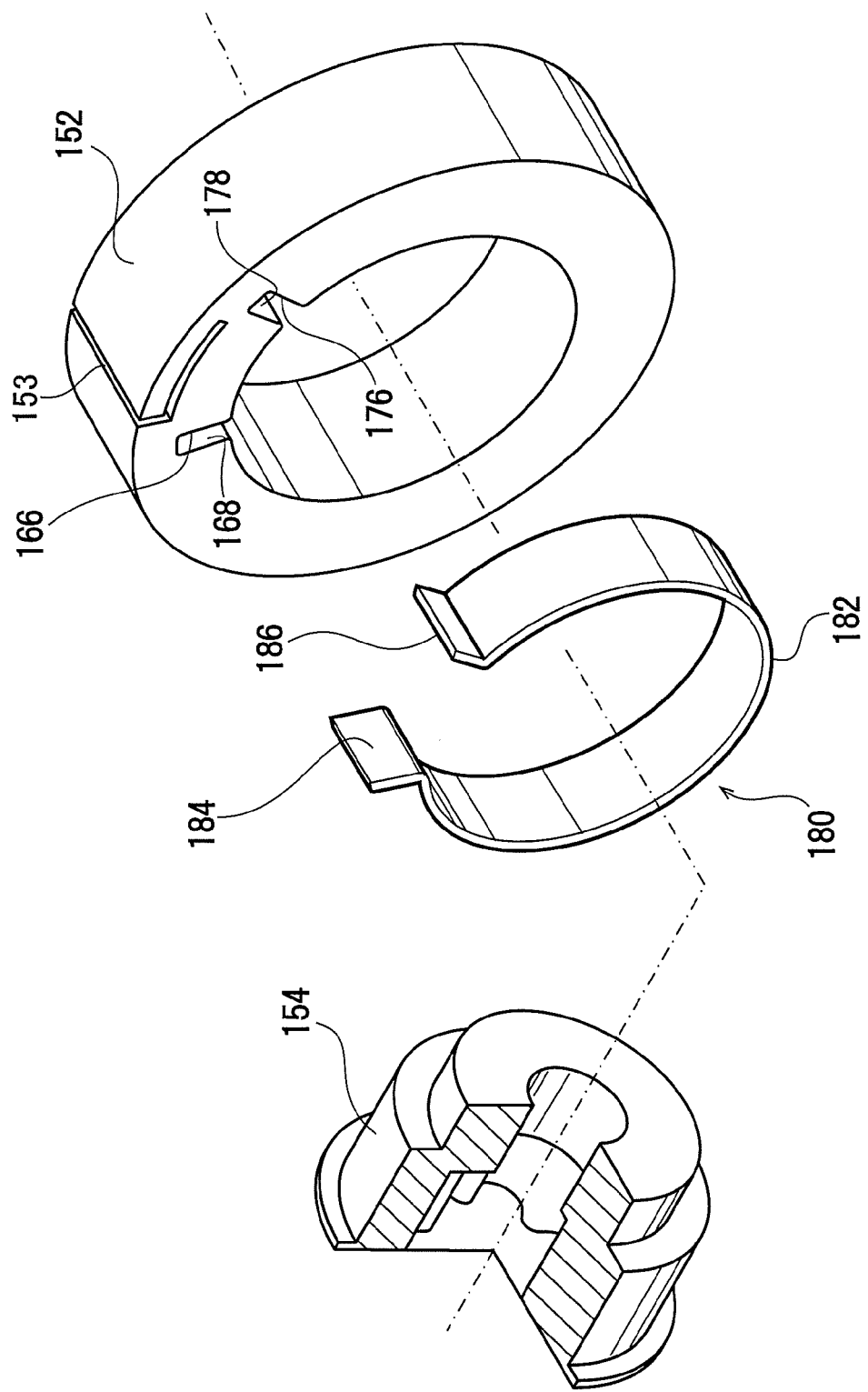
FIG. 9 is an exploded perspective view corresponding to FIG. 2 showing another modification of the clutch member.
Figure 10:
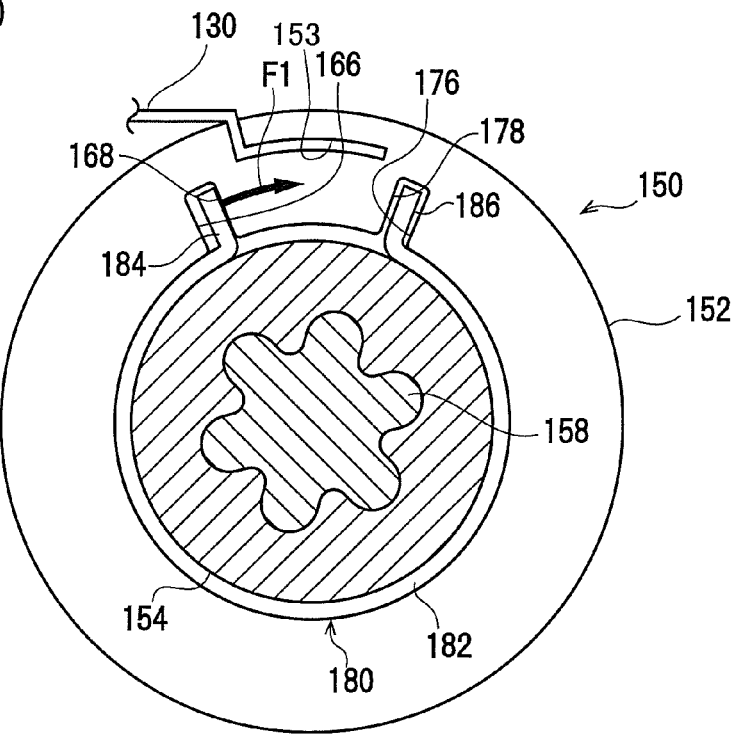
FIG. 10 is a schematic side view corresponding to FIG. 4 showing the clutch member shown in FIG. 9.
Figure 11:
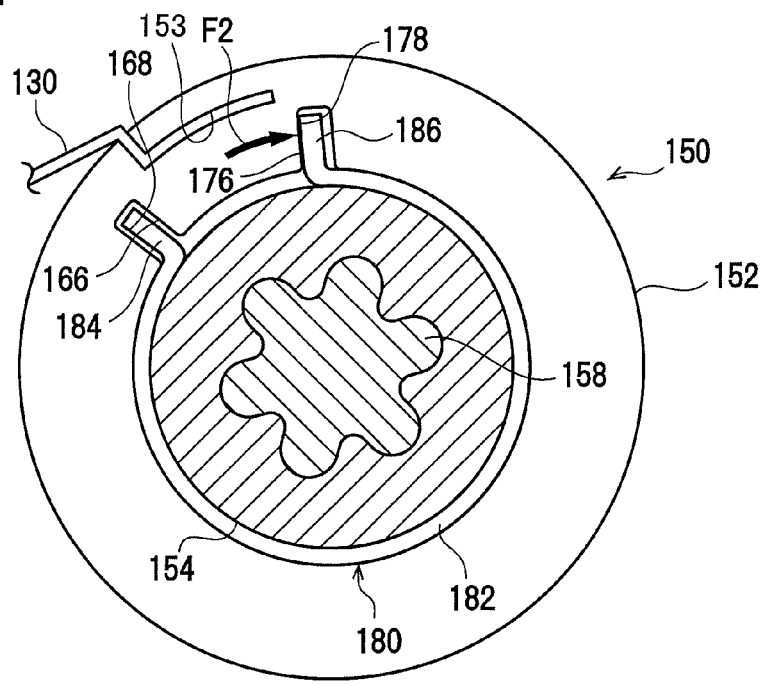
FIG. 11 is a schematic side view corresponding to FIG. 5 showing the clutch member shown in FIG. 9.

Further, in the present embodiment, the clutch member is configured by the coiled clutch spring 160, but the clutch member is not limited to this configuration. For example, as shown in FIG. 9 to FIG. 11, a clutch spring 180 configured by a plate spring may also be used for the clutch member. The clutch spring 180 is equipped with a spring body 182 that is curved in the shape of a substantial "C" about the central axis of the ring 152 and the clutch wheel 154. A spring-side pressing portion 184, which functionally corresponds to the spring-side pressing portion 164 of the clutch spring 160, and a spring-side load receiving portion 186, which functionally corresponds to the spring-side load receiving portion 174 of the clutch spring 160, are formed on the spring body 182.

However, when seen from the same orientation along the direction of the central axis of the ring 152 and the clutch wheel 154, the positions where the spring-side pressing portion 184 and the spring-side load receiving portion 186 are formed on the spring body 182 are the opposite of the positions where the spring-side pressing portion 164 and the spring-side load receiving portion 174 are formed on the clutch spring 160 (that is, the spring-side load receiving portion 186 extends outward in the radial direction from one circumferential direction end of the spring body 182, and the spring-side pressing portion 184 extends outward in the radial direction from the other end). Moreover, the positions where the pressing portion accommodating portion 166 and the load receiving portion accommodating portion 176 are formed are also the opposite in correspondence to the positions where the spring-side pressing portion 184 and the spring-side load receiving portion 186 are formed.

Even in this configuration, the spring body 182 elastically deforms in such a way that both circumferential direction ends are away from each other due to the force that the spring-side pressing portion 184 receives from the ring-side load receiving portion 168 of the pressing portion accommodating portion 166 (that is, the urging force of the reducing balance spring 130), and due to this the spring body 182 is loosened. Further, the spring body 182 elastically deforms such that both circumferential direction ends are away from each other due to the force that the spring-side load receiving portion 186 receives from the ring-side pressing portion 178, and due to this the spring body 182 is loosened. Consequently, even in this configuration, the same effects as the effects described above can be obtained.

Even in a case where the clutch member is configured by a coiled member such as the clutch spring 160, as long as the clutch member has a configuration where the spring body 162 is loosened in a case where the spring-side pressing portion 164 receives a force from the ring-side load receiving portion 168, a case where the spring-side load receiving portion 174 receives a force from the ring-side pressing portion 178, it is of course also possible to form the spring-side pressing portion 164 and the spring-side load receiving portion 174 in the same positions where the spring-side pressing portion 184 and the spring-side load receiving portion 186 are formed on the clutch spring 180.

Further, in the present embodiment, the webbing retractor 10 has a configuration in which the support member 155 is disposed, but as described above, if the ratchet gear 92 rotates in the retraction direction due to inertia, a large load can be prevented or suppressed from acting on the reducing balance spring 130. Consequently, the webbing retractor 10 may also be given a configuration in which the support member 155 is not disposed.

Moreover, in the present embodiment, the inner diameter dimension of the spring body 162 in a case where the shape of the spring body 162 of the clutch spring 160 is regarded as a cylinder and the outer diameter dimension of the section of the clutch wheel 154 around which the spring body 162 is placed are substantially equal shapes. However, the inner peripheral shape of the spring body 162 and the outer peripheral shape of the clutch wheel 154 are not limited to the shapes. For example, the clutch wheel 154 and the spring body 162 may also be given a configuration where a gap is set between the outer peripheral surface of the clutch wheel 154 and the inner peripheral portion of the spring body 162, the size of the gap is appropriately varied in the circumferential direction and in the axial direction of the clutch wheel 154, and the frictional resistance that arises between the outer peripheral surface of the clutch wheel 154 and the inner peripheral portion of the spring body 162 is appropriately varied in the circumferential direction and in the axial direction of the clutch wheel 154.

Further, in the above-described embodiment, the second rotating body has a configuration where the ring 152 that serves as the second rotating body and configures the clutch 150 is annular and the pressing portion accommodating portion 166 and the ring-side pressing portion 178 that serves as the second rotating body-side pressing portion penetrate the ring 152 in the direction of the central axis of the ring 152. However, the configuration of the second rotating body is not limited to this configuration. Next, a modification of the second rotating body will be described as a second embodiment. In describing the second embodiment, in relation to sites that are basically identical to those in the first embodiment, identical reference signs will be given thereto and detailed description thereof will be omitted.

Second Embodiment

Figure 12:
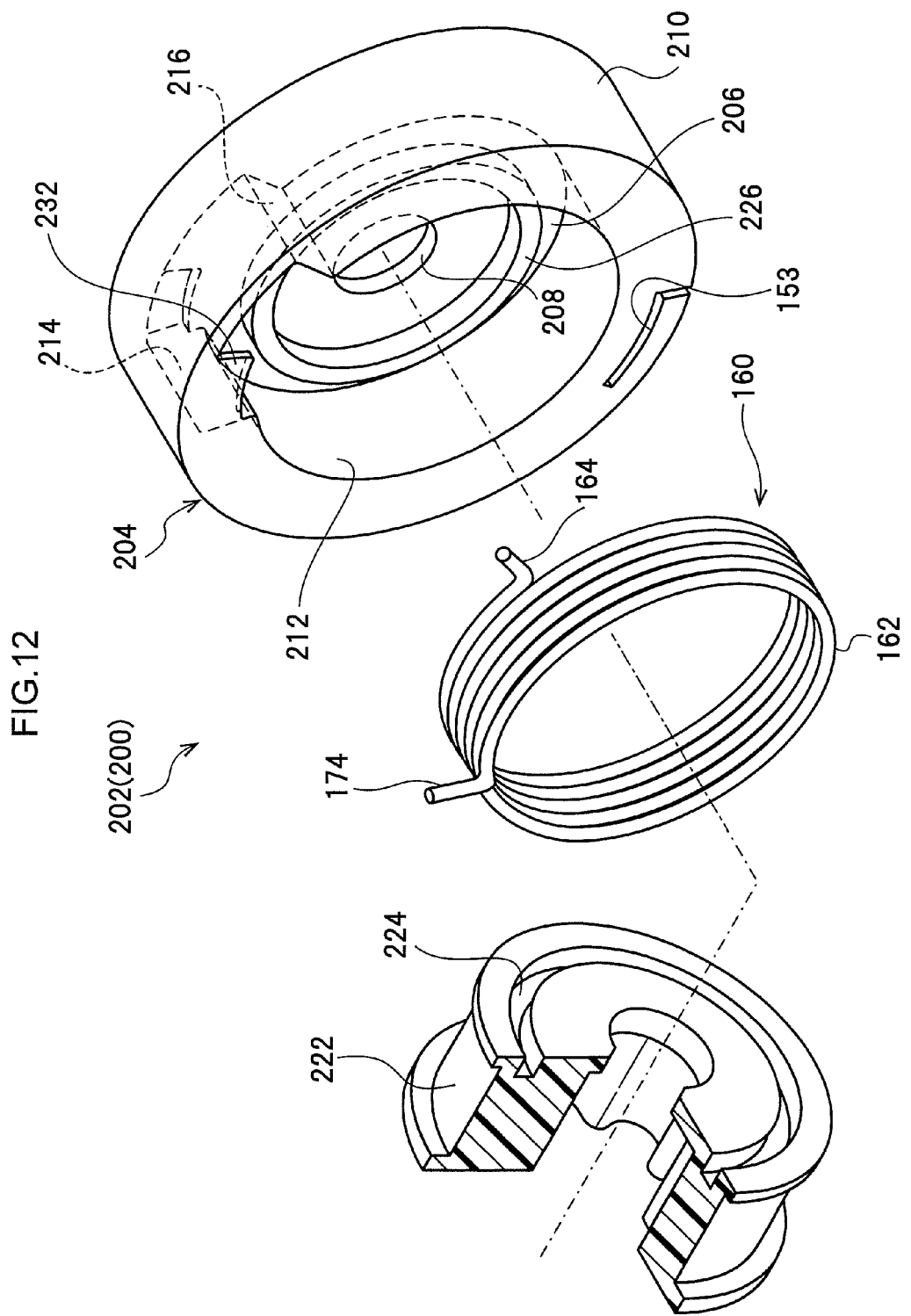
FIG. 12 is an exploded perspective view showing the configuration of a clutch member of a webbing retractor pertaining to a second embodiment of the invention.

In FIG. 12, the configuration of a clutch 202 of a webbing retractor 200 pertaining to the second embodiment is shown by an exploded perspective view corresponding to FIG. 2 that described the first embodiment.

As shown in FIG. 12, the clutch 202 of the webbing retractor 200 is equipped with a ring 204 that serves as a second rotating body. The ring 204 is equipped with a bottom wall 206 that serves as a clutch stopper. The bottom wall 206 is formed in the shape of a substantial disc plate, and a circular through hole 208 through which the shaft portion 104 passes is formed in the substantial center thereof.

An outside peripheral wall 210 that is shaped like a cylinder is formed from the outer peripheral portion of the bottom wall 206 toward the spring cover 42 side. Further, inside the outside peripheral wall 210, an inside peripheral wall 212 is formed from the bottom wall 206 toward the spring cover 42 side. The inside peripheral wall 212 is formed parallel with respect to the outside peripheral wall 210 but it is not annular like the outside peripheral wall 210; rather, the inside peripheral wall 212 is formed in the shape of a substantial "C" in which part of a ring has been cut out.

A ring-side pressing wall 214, which serves as a second rotating body-side pressing portion corresponding to the ring-side pressing portion 178 in the first embodiment, extends from one circumferential direction end of the inside peripheral wall 212 toward the outside peripheral wall 210 side. A ring-side load receiving wall 216, which corresponds to the ring-side load receiving portion 168 in the first embodiment, extends from the other circumferential direction end of the inside peripheral wall 212 toward the outside peripheral wall 210 side. The end portions of the ring-side pressing wall 214 and the ring-side load receiving wall 216 on the opposite side of the inside peripheral wall 212 side are connected to the outside peripheral wall 210. The spring-side load receiving portion 174 and the spring-side pressing portion 164 of the clutch spring 160 are accommodated between the ring-side pressing wall 214 and the ring-side load receiving wall 216 (in an accommodating section).

The direction in which the coil is wound in the spring body 162 of the clutch spring 160 of the present embodiment is the opposite of the direction in which the coil is wound in the spring body 162 of the clutch spring 160 of the first embodiment. For this reason, the spring-side load receiving portion 174 is positioned at the spring cover 42 side with respect to the spring-side pressing portion 164.

The clutch 202 is equipped with a clutch wheel 222 instead of the clutch wheel 154. The body section of the clutch wheel 222 penetrates the spring body 162 of the clutch spring 160. The clutch wheel 222 is placed inside the inside peripheral wall 212. An annular groove 224 that is concentric with the outer peripheral portion of the clutch wheel 222 is formed in the surface of the clutch wheel 222 that faces the bottom wall 206 in this state.

A guide ring 226 is formed on the bottom wall 206 of the ring 204 in correspondence to the annular groove 224. The guide ring 226 is formed coaxially with respect to the outside peripheral wall 210 and the through hole 208 of the ring 204. The guide ring 226 enters the annular groove 224 in a state in which the clutch wheel 222 has been placed inside the inside peripheral wall 212. Due to this, the clutch wheel 222 is supported in the ring 204 in such a way as to be relatively rotatable coaxially with respect to the ring 204.

Figure 13:
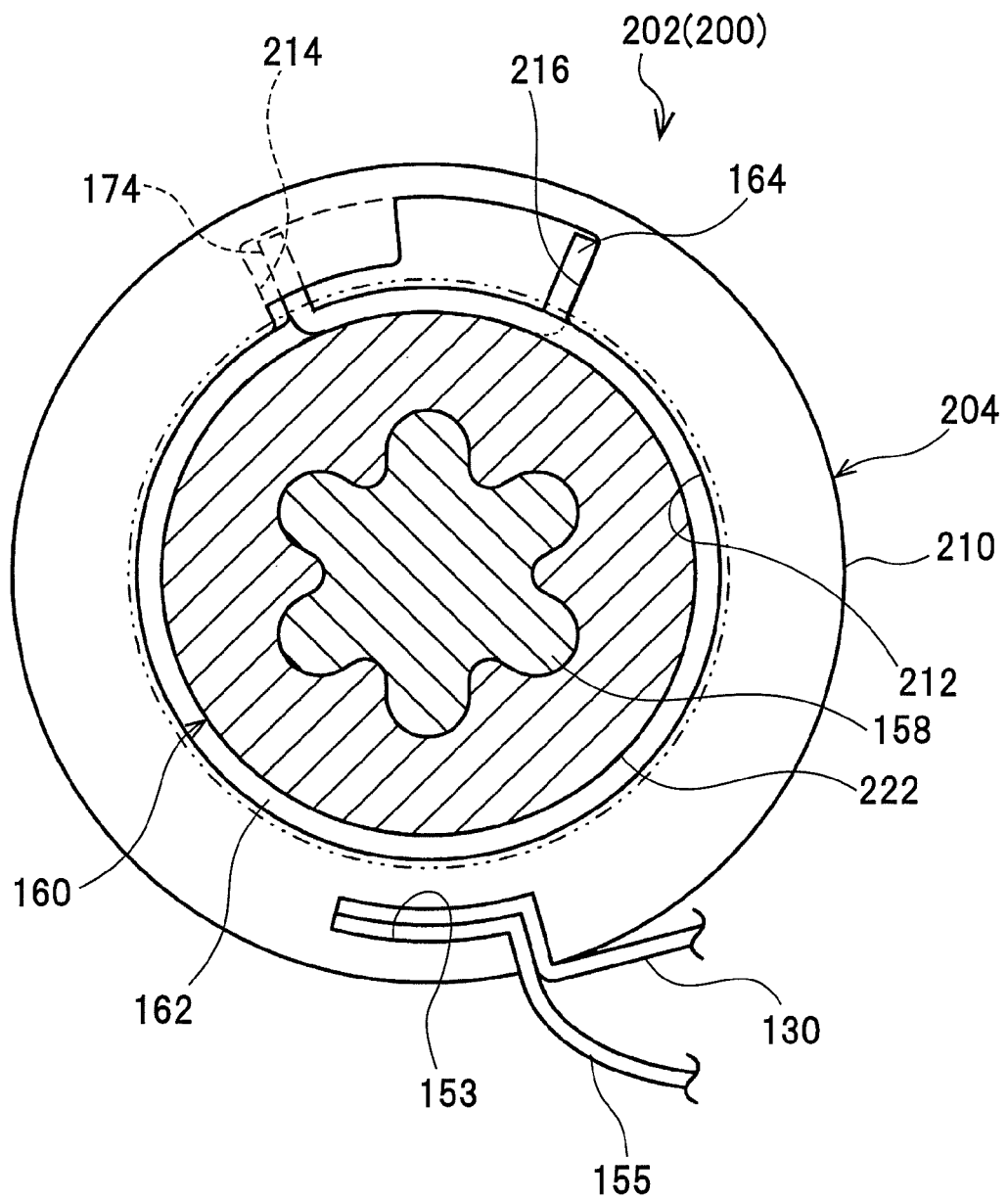
FIG. 13 is a side view showing the configuration of the clutch member of the webbing retractor pertaining to the second embodiment of the invention.
Figure 14:
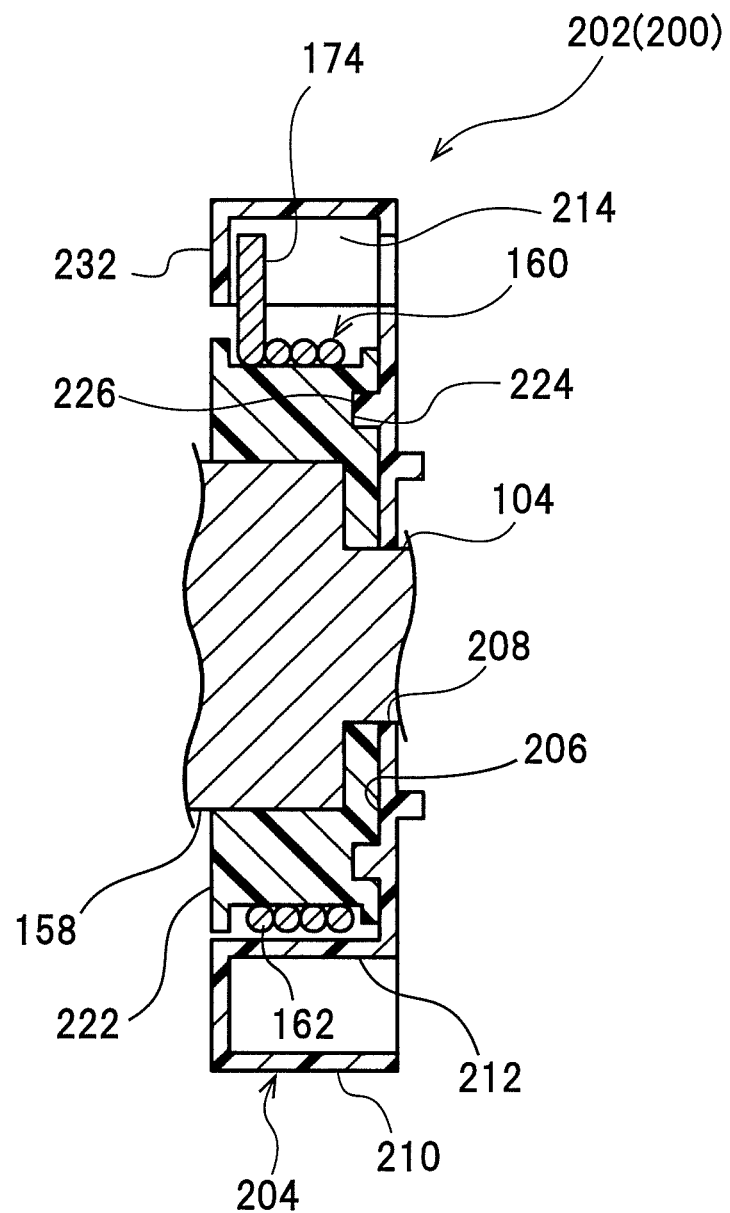
FIG. 14 is a front sectional view showing the configuration of the clutch member of the webbing retractor pertaining to the second embodiment of the invention.

Further, a regulating wall 232 that serves as a clutch stopper is formed on the end portion of the outside peripheral wall 210 on the opposite side of the bottom wall 206 side. The regulating wall 232 extends from the outside peripheral wall 210 inward in the radial direction of the outside peripheral wall 210 in a position between the ring-side pressing wall 214 and the ring-side load receiving wall 216 from the position where the ring-side pressing wall 214 is formed. In a state in which the clutch spring 160 has been attached to the clutch wheel 222, as shown in FIG. 13 and FIG. 14, the regulating wall 232 is positioned at the spring cover 42 side with respect to the spring-side load receiving portion 174 of the clutch spring 160, and the bottom wall 206 is positioned at the opposite side of the spring cover 42 side with respect to the spring-side pressing portion 164 of the clutch spring 160.

In the present embodiment, when the clutch spring 160 disposed on the clutch wheel 222 tries to displace toward the spring cover 42 side along the central axis of the ring 204, the regulating wall 232 interferes with the spring-side load receiving portion 174. Due to this, the displacement of the clutch spring 160 toward the spring cover 42 side is regulated. When the clutch spring 160 tries to displace toward the opposite side of the spring cover 42 side along the central axis of the ring 204, the bottom wall 206 interferes with the spring-side pressing portion 164. Due to this, the displacement of the clutch spring 160 toward the opposite side of the spring cover 42 side is regulated. In this way, in the present embodiment, displacement of the clutch spring 160 along the direction of the central axis of the ring 204 can be prevented.

Further, other than the ring 204 having the bottom wall 206 and the regulating wall 232, the configurations are the same as those in the first embodiment, so the same action as in the first embodiment can be achieved and the same effects as in the first embodiment can be obtained.

What is claimed is:

1. A webbing retractor comprising:
a spool that retracts a webbing;
a retracting spring that urges the spool in a retraction direction in which the spool retracts the webbing;
a first rotating body that interlockingly rotates with the spool;
a clutch member that is provided at the first rotating body in a state in which the clutch member is elastically in pressure contact with the first rotating body, and that rotates together with the first rotating body;
a second rotating body that receives a pressing force from the clutch member and rotates;
a reducing balance spring that has one end engaged with the second rotating body, urging force of the reducing balance spring increasing by the one end rotating in an orientation corresponding to rotation of the spool in the retraction direction with respect to another end of the reducing balance spring;
a third rotating body with which the other end of the reducing balance spring is engaged; and
a regulating member that regulates rotation of the third rotating body by a tongue provided on the webbing being attached to a buckle,
wherein the webbing retractor is set such that
pressure contact of the clutch member with respect to the first rotating body is loosened due to a reaction force of pressing force, which the clutch member receives from the second rotating body, when the clutch member rotates together with the first rotating body, and
the pressure contact of the clutch member with respect to the first rotating body is loosened by the third rotating body, rotating due to the urging force of the reducing balance spring, pressing the clutch member via the reducing balance spring, and
wherein the clutch member is configured to include: a spring body that is wound onto an outer peripheral portion of the first rotating body, the spring body including:
a spring-side pressing portion that extends outward in a radial direction from one end of the spring body and that faces a second rotating body-side load receiving portion set in the second rotating body, the spring-side pressing portion pressing the second rotating body-side load receiving portion in a predetermined rotational direction to cause the second rotating body to rotate in the predetermined rotational direction due to the spring body rotating in the predetermined rotational direction, and
a spring-side load receiving portion that extends outward in the radial direction from the other end of the spring body and that faces a second rotating body-side pressing portion set in the second rotating body, the spring-side load receiving portion being pressed by the second rotating body-side pressing portion due to the second rotating body rotating in the predetermined rotational direction.

2. The webbing retractor of claim 1, wherein a clutch stopper is disposed in the second rotating body, the clutch stopper facing, in a central axis direction of the second rotating body, at least one of the spring-side pressing portion or the spring-side load receiving portion, and the clutch stopper interfering with the at least one of the spring-side pressing portion or the spring-side load receiving portion to regulate displacement of the at least one of the spring-side pressing portion or the spring-side load receiving portion along the central axis direction.

3. The webbing retractor of claim 1, wherein the spring body has a coil shape.

4. The webbing retractor of claim 1, wherein the spring body has a plate-spring shape.

5. The webbing retractor of claim 1, wherein
the second rotating body has ring shape, and the clutch member is arranged inside the second rotating body, and
the spring-side pressing portion and the spring-side load receiving portion are arranged inside an accommodating section that opens at an inner peripheral portion of the second rotating body.

6. The webbing retractor of claim 5, wherein the second rotating body-side load receiving portion and the second rotating body-side pressing portion are wall portions, directing a circumferential direction of the second rotating body, of the accommodating section.

\* \* \* \* \*